US012676819B2

(12) United States Patent
Bagavathiappan et al.

(10) Patent No.: US 12,676,819 B2
(45) Date of Patent: Jul. 7, 2026

(54) ADAPTIVE CONCURRENCY CONTROL FOR MEDIA PIPELINE

(71) Applicants: DISH Network Technologies India Private Limited, Bengaluru (IN); DISH Network L.L.C., Englewood, CO (US)

(72) Inventors: Sivasubramanian Bagavathiappan, Coimbatore (IN); Deepan Prabhu Babu, Fremont, CA (US); PavanKumar Thalak, Parker, CO (US)

(73) Assignees: DISH Network Technologies India Private Limited, Bengaluru (IN); DISH Network L.L.C., Engiewood (CO)

( * ) Notice: Subject to any disclaimer, the term of this patent is extended or adjusted under 35 U.S.C. 154(b) by 0 days.

(21) Appl. No.: 18/393,280

(22) Filed: Dec. 21, 2023

(65) Prior Publication Data

US 2025/0211530 A1     Jun. 26, 2025

(51) Int. Cl.
| | |
|---|---|
| *G06F 15/173* | (2006.01) |
| *H04L 41/16* | (2022.01) |
| *H04L 47/11* | (2022.01) |
| *H04L 47/24* | (2022.01) |
| *H04N 7/173* | (2011.01) |
| *H04N 21/422* | (2011.01) |
| *H04N 21/438* | (2011.01) |
| *H04W 28/08* | (2023.01) |
| *H04W 28/10* | (2009.01) |

(52) U.S. Cl.
CPC .............. *H04L 47/11* (2013.01); *H04L 41/16* (2013.01); *H04L 47/24* (2013.01)

(58) Field of Classification Search
CPC ........... H04L 47/11; H04L 41/16; H04L 47/24
USPC ......................................................... 709/238
See application file for complete search history.

(56) References Cited

U.S. PATENT DOCUMENTS

| | | | | |
|---|---|---|---|---|
| 6,363,429 | B1 * | 3/2002 | Ketcham ................. | H04L 65/80 |
| | | | | 709/233 |
| 7,899,059 | B2 * | 3/2011 | Ramprashad ......... | H04W 28/02 |
| | | | | 370/395.42 |
| 10,362,356 | B2 * | 7/2019 | Gonzalez ............. | H04N 21/458 |
| | | (Continued) | | |

FOREIGN PATENT DOCUMENTS

| | | | | |
|---|---|---|---|---|
| CN | 114142967 B | * | 7/2024 | ........ H04W 28/0268 |

*Primary Examiner* — Umar Cheema
*Assistant Examiner* — Golam Mahmud
(74) *Attorney, Agent, or Firm* — Kilpatrick Townsend & Stockton LLP

(57) ABSTRACT

A method may include receiving a network alert associated with a cloud network configured to provide a plurality of data streams to user devices and including one or more network components. The network alert may include request data associated with one or more requests received from respective user devices. The method may include determining a network status of the cloud network indicating a network load. The method may include providing the request data and/or the network status to a machine learning model configured to assign a priority score of each data stream. The method may include determining a high-priority data stream and a second data stream. The method may include providing first instructions indicating that the high-priority data stream is to be provided to a first user device according to respective requests.

20 Claims, 7 Drawing Sheets

(56) References Cited

U.S. PATENT DOCUMENTS

| 10,511,991 | B2 * | 12/2019 | Ma | H04L 1/0009 |
|---|---|---|---|---|
| 2008/0273455 | A1 * | 11/2008 | Green | H04L 1/1877 |
| | | | | 370/218 |
| 2012/0324091 | A9 * | 12/2012 | Raleigh | H04L 41/0894 |
| | | | | 709/224 |
| 2013/0053014 | A1 * | 2/2013 | Sung | H04W 48/08 |
| | | | | 455/418 |
| 2015/0215941 | A1 * | 7/2015 | Cook | H04M 11/062 |
| | | | | 370/329 |
| 2015/0223109 | A1 * | 8/2015 | Raleigh | H04M 15/44 |
| | | | | 370/230 |
| 2020/0127911 | A1 * | 4/2020 | Gilson | H04L 43/0847 |
| 2020/0293999 | A1 * | 9/2020 | Bhattacharya | G06N 20/00 |
| 2022/0030050 | A1 * | 1/2022 | Ergen | G06F 9/5016 |
| 2022/0150122 | A1 * | 5/2022 | Suwi | H04L 41/0895 |
| 2022/0353570 | A1 * | 11/2022 | Rasool | H04N 21/42215 |
| 2023/0300084 | A1 * | 9/2023 | Eaton | H04L 47/785 |
| 2024/0323097 | A1 * | 9/2024 | Masood | G06F 3/121 |
| 2025/0081042 | A1 * | 3/2025 | Agarwal | H04W 28/10 |

* cited by examiner

Figure 5:
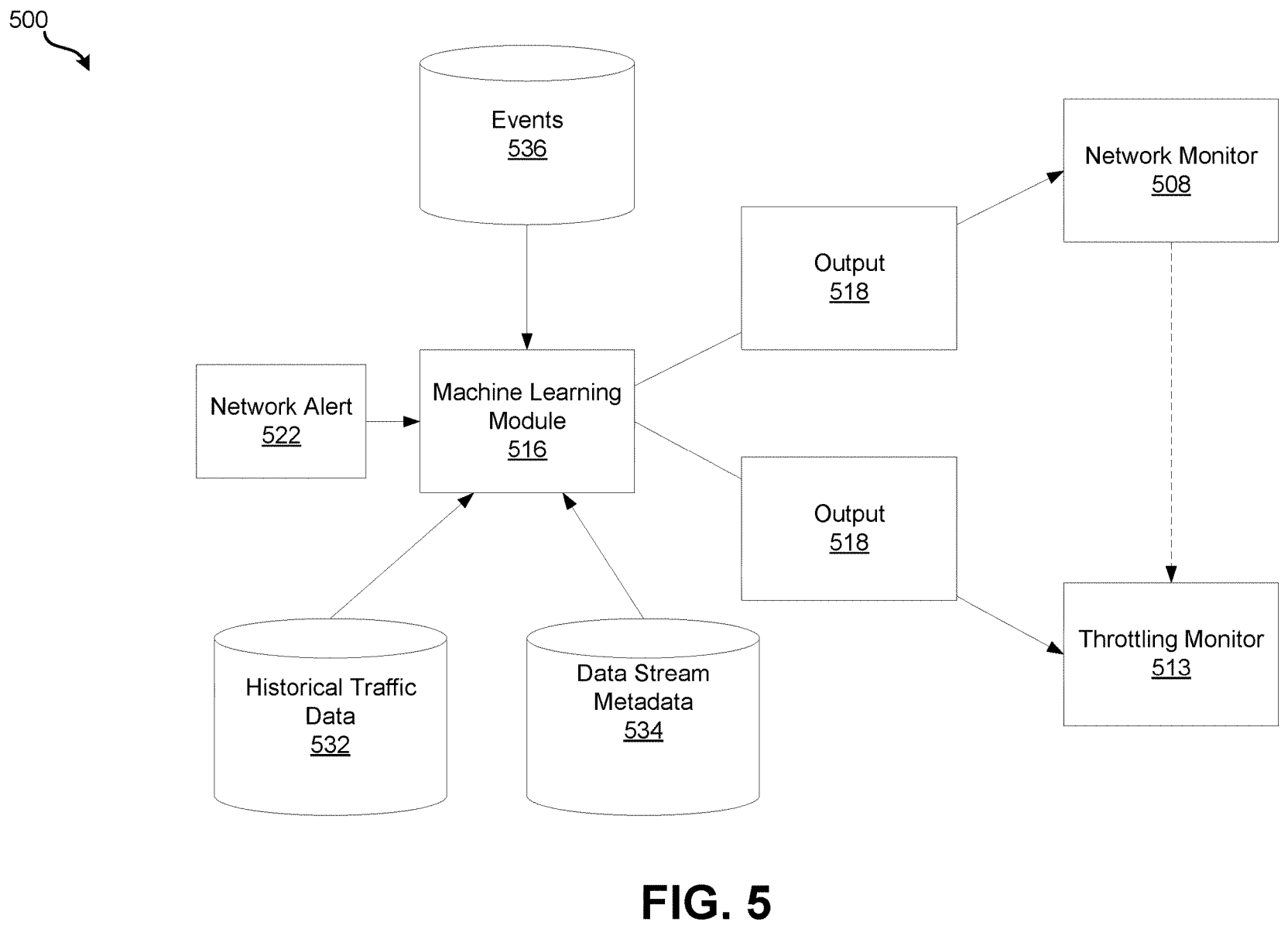

Network Monitor
508

Throttling Monitor
513

Output
518

Output
518

Events
536

Machine Learning
Module
516

Data Stream
Metadata
534

Network Alert
522

Historical Traffic
Data
532

Receive requests for data streams ~ 702

Determine a priority score ~ 704

Determine a high-priority data stream and a second data stream ~ 706

Provide the high-priority data stream ~ 708

Provide the second data stream ~ 710

ADAPTIVE CONCURRENCY CONTROL FOR MEDIA PIPELINE

BACKGROUND

The delivery of data streams via a cloud network involves several network components working in concert. Requests for data streams may increase a network load experienced by the cloud network and/or the network components thereof. During certain times, the increased network load may overwhelm some or all of the cloud network and the components thereof. This may result in a degradation of service experienced by user devices associated with the requests.

BRIEF SUMMARY

A method of providing data streams may include receiving, by a computing system, a network alert associated with a cloud network configured to provide a plurality of data streams to user devices and including one or more network components, the network alert including request data associated with one or more requests received from respective user devices for at least one of the plurality of data streams. The method may include determining, by the computing system, a network status of the cloud network, the network status indicating a network load of the cloud network. The method may include providing, by the computing system, at least one of the request data and the network status to a machine learning model, the machine learning model configured to assign a priority score of each of the plurality of data streams based on the request data and/or the network status. The method may include determining, by the computing system and using the priority scores of the machine learning model, a high-priority data stream of the plurality of data streams and a second data stream of the plurality of data streams. The method may include providing, by the computing system, first instructions to at least one of the one or more network components indicating that the high-priority data stream of the plurality of data streams is to be provided to a first user device according to a request for the high-priority data stream at a first rate. The method may include providing, by the computing system, second instructions to at least one of the one or more network components indicating that the second data stream of the plurality of data streams is to be provided to a second user device corresponding to a request for the second data stream at a second rate.

In some embodiments, the method may also include determining, by the computing system, that the network load exceeds a traffic threshold of the cloud network. The method may include determining, by the computing system, the first rate and the second rate such that the high-priority data stream and the second data stream are provided to the first user device and the second user device, respectively, and the network load is below the traffic threshold.

The network alert may include predicted request data generated by the machine learning model and the network status may include a predicted network load generated by the machine learning model. The predicted request data and the predicted network load are generated by the machine learning model and based on one or more characteristics of the respective user devices. The predicted request data and the predicted network load may be generated by the machine learning model and based metadata associated with the plurality of data streams. The machine learning model may be trained using at least one of one current event data, future event data, and data associated with historical data streams.

The priority score of each of the plurality of data streams may be determined in part based on a characteristic of the respective user devices.

In some embodiments, a portion of the request data may include a retry request. Based at least in part on the network status, the method further may include determining, by the computing system, a user device corresponding to the retry request. The method may include transmitting, by the computing system, instructions to the user device associated with the retry request to transmit subsequent retry requests to the cloud network according to a retry schedule. The retry schedule may be based at least in part on the network load.

A system may include a network monitor, a throttling module and a machine learning model. The system may also include one or more processors and a non-transitory-computer readable medium including instructions that, when executed by the one or more processors, cause the system to perform operations. According to the operations, the system may receive, by the network monitor, a network alert associated with a cloud network configured to provide a plurality of data streams to user devices and including one or more network components, the network alert including request data associated with one or more requests received from respective user devices for at least one of the plurality of data streams. The system may determine, by the network monitor, a network status of the cloud network, the network status indicating a network load of the cloud network. The system may provide, by the network monitor, at least one of the request data and the network status to the machine learning model, the machine learning model configured to assign a priority score of each of the plurality of data streams based on the request data and/or the network status. The system may determine, by the system and using the priority scores of the machine learning model, a high-priority data stream of the plurality of data streams and a second data stream of the plurality of data streams. The system may provide, by the throttling module, instructions to at least one of the one or more network components indicating that the high-priority stream of the plurality of data streams is to be provided to a first user device according to a request for the high-priority data stream at a first rate. The system may provide, by the throttling module, instructions to at least one of the one or more network components indicating that the second data stream of the plurality of data streams is to be provided to a second user device corresponding to a request for the second data stream at a second rate.

In some embodiments, a portion of the request data may include a retry request. Based at least in part on the network status, the system may determine a user device corresponding to the retry request. The system may transmit, by the throttling module, instructions to the user device associated with the retry request to send subsequent retry requests to cloud network according to a retry schedule. The system may further determine, by the network monitor, that the network load exceeds a traffic threshold of the cloud network. The system may determine, by the throttling module, the first rate and the second rate such that the high-priority data stream and the second data stream are provided to the first user device and the second user device, respectively, and the network load is below the traffic threshold. The network alert may include predicted request data generated by the machine learning model and the network status may include a predicted network load generated by the machine learning model. The predicted request data may be generated, at least in part, by a second machine learning model and the predicted network load may be generated, at least in part, by a third machine learning model.

A system may include one or more processors and a non-transitory-computer readable medium may include instructions. When executed by the one or more processors, the system may perform operations. According to the operations, the system may receive a network alert associated with a cloud network configured to provide a plurality of data streams to user devices and including one or more network components, the network alert including request data associated with one or more requests received from respective user devices for at least one of the plurality of data streams. The system may determine a network status of the cloud network, the network status indicating a network load of the cloud network. The system may provide at least one of the request data and the network status to a machine learning model, the machine learning model configured to assign a priority score of each of the plurality of data streams based on the request data and/or the network status. The system may determine, using the priority scores of the machine learning model, a high-priority data stream of the plurality of data streams and a second data stream of the plurality of data streams. The system may provide instructions to at least one of the one or more network components indicating that the high-priority stream of the plurality of data streams is to be provided to a first user device according to a request for the high-priority data stream at a first rate. The system may provide instructions to at least one of the one or more network components indicating that the second data stream of the plurality of data streams is to be provided to a second user device corresponding to a request for the second data stream at a second rate.

In some embodiments, a portion of the request data may include a retry request. Based at least in part on the network status, the system may determine a user device corresponding to the retry request. The system may transmit instructions to the user device associated with the retry request to send subsequent retry requests to the cloud network according to a retry schedule. The network alert may include predicted request data generated by the machine learning model and the network status may include a predicted network load generated by the machine learning model. The system the priority score of each of the plurality of data streams may be determined in part based on a characteristic of the respective user devices.

BRIEF DESCRIPTION OF THE DRAWINGS

FIG. 5 illustrates system including a machine learning model for prioritizing data streams, according to certain embodiments.

DETAILED DESCRIPTION

Figure 1:
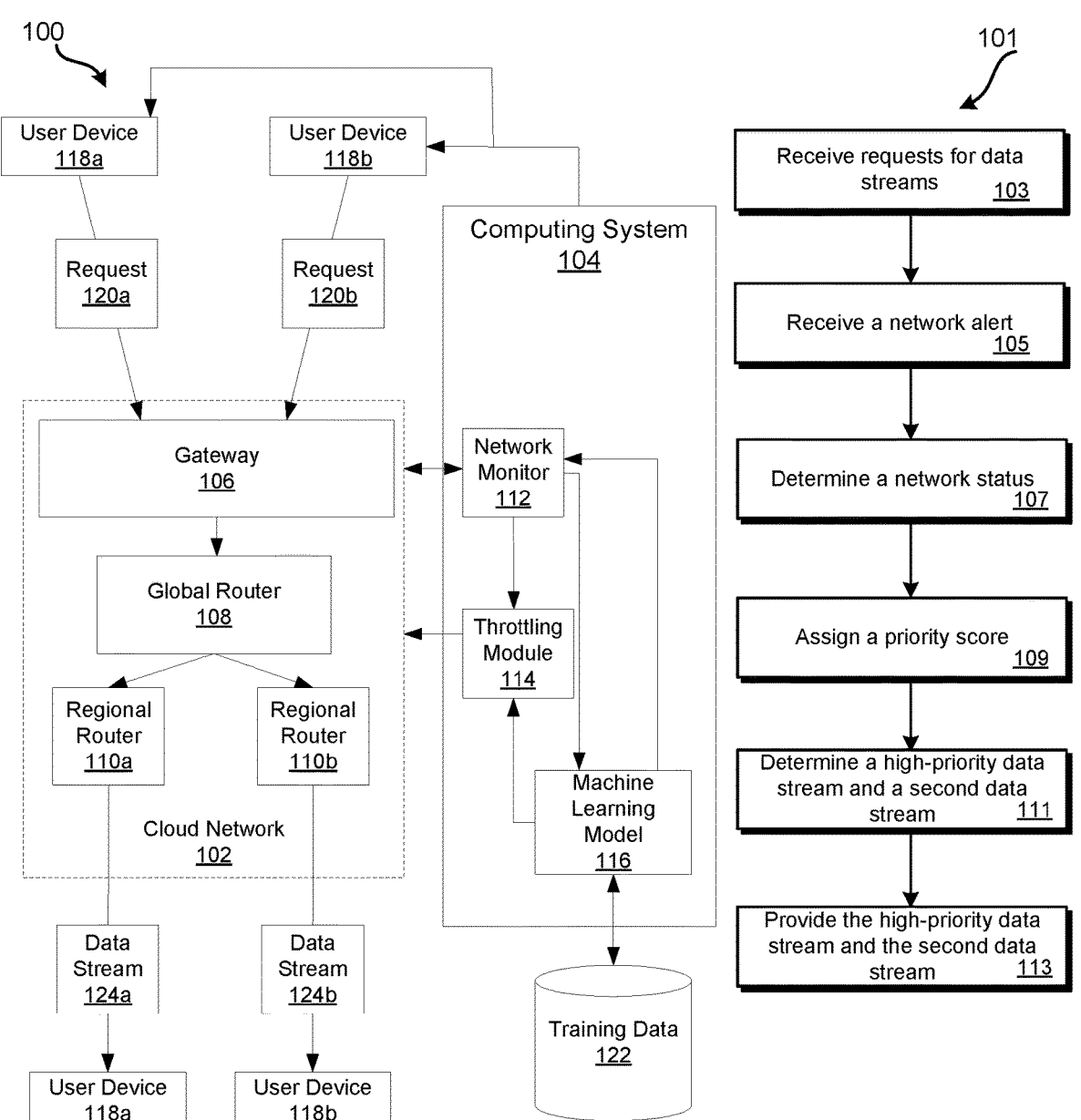
FIG. 1 illustrates a system and a process for providing data streams to user devices, according to certain embodiments.

A media provider may utilize data streams to provide media consumers with access to content. The data streams may be provided using various networks such as the internet via a cloud based network. Whereas terrestrial content (e.g., cable) may be provided with one party's infrastructure (or a limited number), content provided over data streams may utilize network infrastructure of several parties. For example, the network infrastructure associated with the media consumer (e.g., home internet infrastructure such as a router, etc.), an internet service provider (e.g., coaxial cable, fiber, etc., both from the street and as the backbone of a network) a cloud network provider, a data stream provider (e.g., compute instances hosting network components for a data stream provider), and other parties. A sudden demand for content may cause performance degradation for some or all users attempting to access the content via data stream. This may be exacerbated by live events services, such as live television.

A popular sporting event may cause an outsized demand by content consumers to request a data stream of the sporting event. The outsized demand may not only be a higher percentage of normal traffic experienced by a data stream provider but may additionally or alternatively be an increase in the overall traffic experienced. For example, the channel showing the sporting event may normally make up some percentage of the total network traffic of the streaming content provider (e.g., 5%). During the sporting event, however, the channel showing the sporting event may make up a much greater proportion of the total network traffic (e.g., 10%). Furthermore, some content consumers may request a stream of the sporting event outside of their normal streaming behaviors. In other words, the sporting event may increase the network load of the streaming content provider (and associated networks). Because of the increased network load, some or all content consumers may experience a degradation in service. Additionally, one or more components of the streaming content provider and/or associated networks may fail or experience an error.

However popular the sporting event, some content consumers may request other streaming content. For example, a children's program may be live at the same time as the sporting event. A news program or other program may also be streaming live at the same time as the sporting event. Thus, the network traffic of the streaming content provider may be composed of several content streams in addition to the sporting event.

In response to the increased network traffic, the streaming content provider may throttle all network traffic, causing all users to experience the same performance degradation. To throttle the network traffic, the streaming content provider may buffer one or more of the data streams. This means that the streams of the sporting event, the children's program, and the news program may be buffered, or temporarily slowed such that when a content consumer gets access to their requested data stream, the data stream may be received smoothly (at least temporarily). However, this means that when requesting a data stream, one or more content consumers may receive an error, as the data stream may not load. If data streams may be prioritized at the data stream provider level, then some or all users may not experience service degradation due to the increased network load.

One solution may be to monitor requests for data streams as the requests come into the streaming content provider. User devices (e.g., televisions, routers, internet protocol (IP) tv devices, etc.) may request one or more data streams within a given time window. The requests may cause a surge in network traffic (or "network load"). The user devices may retry their respective requests for a data stream a certain number of times before receiving an error message and no longer retrying the request. The surge in network traffic, including some or all of the requests, may be detected a computing system. The surge in network traffic may be analyzed by a machine learning model (MLM) associated with the streaming content provider. The MLM may analyze the requests and/or other components of the network traffic to identify a priority associated with some or all of the data streams. For example, if the network traffic includes an outsized number of requests for a data stream of a sporting event, data streams of the sporting event may be given a highest priority. Other data streams may be prioritized by their proportion of total traffic volume, regulatory compliance, or any other set of factors.

Once the MLM determines a priority for each of the data streams, the output of the MLM may be used to modify the number of retries a user device performs before getting the error message. In high network traffic load situation, therefore, the user devices may be limited in the number of retries in order to reduce network load and enhance performance. The output of the MLM may also be used to prioritize requests received by the streaming content provider. For example, the data stream with the highest priority (e.g., the sporting event) may be provided to requesting user devices first and data streams with a lower priority queued and provided when resources become available.

Additionally, the MLM may be trained to predict a network load based on characteristics associated with the user devices, current and/or future events, metadata associated with the data streams, and/or other such factors. For example, the metadata may indicate that during certain years (e.g., election years) a particular data stream is more frequently requested in a particular region than another data stream. A particular user device in the particular region, may, however, historically request the other data stream. Based on some or all of this information, the MLM may be used to prioritize data streams at a regional level (e.g., prioritizing the particular stream for the particular region), but prioritize the other data stream for the particular user device. Furthermore, the MLM may predict that the total network load within the particular region may be greater than average at times. The output of the MLM may therefore be used to instantiate new network components in order to raise the capacity of the network during those times. Thus, data streams may be provided to various user devices within the particular region with fewer disruptions.

FIG. 1 illustrates a system 100 and a process 101 for providing data streams to user devices 118a-b, according to certain embodiments. The system 100 may be administered by a content provider, providing a data streams to user devices over a cloud-based system. As such, the system 100 may include a cloud network 102 and a computing system 104. The cloud network 102 may be provided by a third-party cloud services provider. The network components of the cloud network 102 may be implemented on one or more compute instances within regions of the cloud network 102, the regions and the one or more compute instances being part of a tenancy of the content provider within the cloud network 102. The network components may include a gateway 106, a global router 108, regional routers 110a-b, and other such components for delivering data streams via the cloud network 102.

The gateway 106 may be cloud-edge component, configured to receive requests for data streams from user devices (e.g., the user device 118a-b). The gateway 106 may be visible to subscribers of the content provider, receiving the requests via HyperText Transfer Protocol (HTTP), Hyper-Text Transfer Protocol Secure (HTTPS), or other network protocols. Although only one gateway 106 is shown, any number of gateways may be present. Each of the gateways may be associated with a particular region of the cloud network 102, or each gateway may provide access to any region within the cloud network 102.

The global router 108 may be configured to receive requests and/or route requested data streams. The requests may be received from the gateway 106. The requested data streams may be accessed by some other component, then passed to the global router 108. Additionally or alternatively, the global router 108 may cause metadata associated with the requested data streams to be transmitted downstream within the cloud network 102 such that the requested data streams are routed to a requesting user device. The global router 108 may parse a given request to determine which region the request should be routed through. The region may depend upon a network load of the cloud network 102, a network load of one or more regions, characteristics associated with the requesting user device (e.g., an IP address, a geographical location, etc.).

The regional routers 110a-b may receive requests and/or requested data streams from the global router 108. The regional routers 110a-b may each be associated with a respective region within the cloud network 102. The regional routers 110a-b may further parse the requests and/or requested data streams to route the requests and/or requested data streams within each respective region. For example, a respective region may include one or more nodes including compute instances with network components. Each node may be associated with a subscriber type. The regional routers 110a-b may then route the requests and/or requested data streams to an appropriate node based on the subscriber type associated with a user device requesting a data stream.

The computing system 104 may be implemented in the cloud network 102 or may be implemented in a separate tenancy of the content services provider. The computing system 104 may additionally or alternatively be implemented on a separate machine(s) and include components that are not part of the cloud network 102. The computing system 104 may include a network monitor 112, a throttling module 114, and a machine learning module 116. The network monitor 112 may be configured to detect data associated with the cloud network 102. The data may include a network status, a request volume, metadata associated with requests being received from user devices (e.g., the user devices 118a-b), and other network information. The network monitor 112 may also be configured to send instructions to one or more of the network components of the cloud network 102. For example, the network monitor 112 may transmit instructions to instantiate additional network components within a region of the cloud network 102, instantiate a new compute instance (hosting new network components, and/or cause compute instances and network components to be brought offline.

The throttling module 114 may be a hardware and/or software component of the computing system 104. The throttling module 114 may be configured to transmit instructions to one or more network components of the cloud network 102. The throttling module 114 may also be configured to transmit instructions to user devices (e.g., the user devices 118a-b). The throttling module 114 may include logic to determine a throttling rate for a particular data stream. For example, the throttling module 114 may determine that requests for a certain data stream should be queued for a particular time (e.g., 5 millisecond, 1 second, 10 seconds, etc.) while determining that a different data stream should be prioritized and not queued. The throttling module 114 may also include logic to determine a retry request rate for user devices (e.g., only send retry requests after 30 seconds).

The machine learning model (MLM) 116 may be configured to analyze the network status and/or the metadata associated with requests to determine priority scores for each of the requested data streams. The MLM 116 may be trained using the training data 122. The training data 122 may include historical traffic data (e.g., how many requests and data streams are requested, which data streams have been requested, etc.). The training data 122 may also include data stream metadata, such as which data streams are searched for at what rate (e.g., via a search engine). The training data 122 may also include one or more current and/or future events (e.g., sporting events, elections, emergency broadcasts, etc.). Based on the training data 122, the MLM may then assign priority scores to each of the data streams provided by the content provider. The MLM 116 may then provider the priority scores to the network monitor 112 and/or the throttling module 114 for further processing and/or analysis.

At step 103, the cloud network 102 may receive requests 120*a-b* for respective data streams from the user devices 118*a-b*, respectively. The requests 120*a-b* may be received by the gateway 106 and include data indicating a requested data stream, the respective user device 118*a-b*, and/or characteristics of the respective user devices 118*a-b*. For example, the request 120*a* may indicate that the user device 118*a* is associated with a first device type, a first account class, and in a first geographical location. The request 120*a* may also indicate that the user device 118*a* is requesting a data stream 124*a* (e.g., a sporting event). The request 120*b* may indicate that the user device 118*b* is associated with a second device type, a second account class, and a second geographical location. The request 120*b* may also indicate that the user device 118*b* is requesting a data stream 124*b* (e.g., a new cast). The requests 120*a-b* may be routed downstream through the cloud network 102 (e.g., to the global router 108, the regional routers 110*a-b*, and other network components) according to the data included in the requests 120*a-b*.

At step 105, the computing system 104 may receive a network alert. The network alert may be received by the network monitor 112. The network alert may indicate an increase in network traffic experienced by one or more components of the cloud network 102. For example, the requests 120*a-b* may cause the gateway 106 to experience a network load higher than is expected and/or higher than the gateway 106 is capable of handling. Similarly, the network alert may indicate that one or more of the global router 108 and/or the regional routers 110*a-b* are experiencing unexpected network loads. The network alert may also include request data indicating information about the requests 120*a-b* (e.g., the associated user devices 118*a-b*, the data streams 124*a-b*, etc.). The network monitor 112 and/or some other component of the computing system 104 may utilize some or all of the information in network alert to determine further data associated with the requests and/or network load. For example, the network monitor 112 may utilize the indication of the user devices 118*a-b* to determine the account class of each of the user devices 118*a-b*, the geographical location of each user device 118*a-b*, and other such information.

At step 107, the computing system 104 may determine a network status of the cloud network 102. The network status may be included in the network alert, received by the network monitor 112, or may be determined in response to receiving the network alert. The network monitor 112 may request the network status from one or more network components of the cloud network 102, or may scan the cloud network 102 and generate the network status. The network status may include a listing of all instantiations of network components within the cloud network 102, within a region of the cloud network 102, etc.

The network status may also indicate a traffic threshold of the cloud network 102. The traffic threshold may indicate a network load able to be handled by some or all of the cloud network 102. The traffic threshold may also include a buffer. For example, the traffic threshold may be set below an actual load limit of the cloud network 102 (e.g., 5% less, 10% less, 20% less, etc.). Thus, transient spikes in network load may be handled by the cloud network 102 without overloading the cloud network 102. The network monitor 112 may determine that the network load indicated in the network alert is above the traffic threshold in the network status. In response, the network monitor 112 may transmit instructions to one or more of the network components to instantiate new network components. By increasing the number of network components, the traffic threshold may be increased. Thus, the cloud network 102 may now be configured to handle the increased traffic load.

The network alert and/or the network status may also be used to adjust the retry schedule of the user devices 118*a-b*. For example, the cloud network 102 may be overwhelmed with network load and be unable to immediately fulfil all requests for data streams. The requests 120*a-b* may then include retry requests for data streams previously requested but not fulfilled. The user devices 118*a-b* may automatically generate and transmit the retry requests each time a request is not fulfilled. The retry requests may add network load to the already-overwhelmed cloud network 102. Thus, the computing system 104 may transmit instructions to the user devices 118*a-b* to delay retry requests and/or only send retry requests according to a retry schedule. The retry schedule may indicate that retry requests are to be sent only every 15 seconds, every 10 seconds etc. The retry schedule may also indicate that after a certain number of retries (e.g., 10), the user devices 118*a-b* are to display an error message and cease transmitting retry requests.

In some embodiments, the network alert and/or network status may be generated in, part by an MLM such as the MLM 116. The network alert may then include predicted requests data. The predicted request data may be based on current events, metadata associated with one or more data streams, historical network data, characteristic of one or more user devices (e.g., the user devices 118*a-b*), and other such data. For example, a sporting event may occur at some point in the future. The MLM 116 may determine that during the sporting event, a total network load may increase above the traffic threshold. The MLM 116 may also determine that a particular data stream is likely to be requested more heavily than other data streams (e.g., a data stream of the sporting event). The MLM 116 may therefore generate the predicted request data that indicates the particular data stream as a high-priority data stream.

The MLM 116 may also indicate via a predicted network load that the total network load during the sporting event is likely to exceed the traffic threshold of the cloud network 102 as currently configured. The network monitor 112 may utilize the predicted network load to pre-emptively instantiate new network components such that the cloud network 102 can handle the predicted network load. During and/or after the sporting event, network data (e.g., a network load, request data, etc.) may be used to retrain the MLM 116. Thus, when a future sporting event occurs, the predicted network load and/or the predicted request data may be more accurate.

At step, the MLM 116 may assign priority scores to the data streams 124*a-b*, based on the network status, the information associated with the requests 120*a-b*, the user devices 118*a-b*, the training data 122 and/or other factors. The MLM 116 may utilize one or more machine learning techniques (e.g., k-nearest neighbor, clustering, logistic regression, decision trees, etc.) and/or rules-based techniques to assign the priority scores. For example, the MLM 116 may determine that the network load indicated in the network alert includes a large percentage of retry requests. The MLM 116 may apply a rules-based filter to the network load, such that when retry requests compose more than a certain percentage of the total network load (e.g., 10%), throttling of data streams is not warranted. In other examples, the MLM 116 may additionally or alternatively use various techniques to determine that a certain data stream should be prioritized throughout the cloud network 102, in a region of the cloud network 102, for a particular user device 118*a-b*, etc.).

At step 111, the computing system 104 may determine a high-priority data stream and a second data stream. The high-priority data stream may be determined in part based on the priority score of the high-priority data stream output by the MLM 116. For example, the MLM 116 may assign a priority score of 1 to the data stream 124*a*, indicating that the data stream 124*a* is the highest priority data stream. The MLM 116 may assign a priority score of 3 to the data stream 124*b*. The computing system 104 may then determine that the data stream 124*a* is the high-priority data stream and the data stream 124*b* is not as high a priority.

In some embodiments, the computing system 104 may determine the high-priority data stream based on other factors. In the example above, the data stream 124 a may have a priority score of 1, and the data stream 124*b* may have a priority score of 3. The priority scores of the data streams 124*a-b* may be used to prioritize streams within the cloud network 102, generally. However, the computing system 104 may determine that the user device 118*b* should have priority over the user device 118*a* (e.g., based on account class). Then, even though the priority score assigned to the data stream 124*b* is lower than that of the data stream 124*a*, the computing system 104 may determine that the data stream 124*b* is the high-priority data stream.

At step 113, the system 100 may provide the data streams 124*a-b* to the appropriate user devices 118*a-b*. The computing system 104 may provide instructions to one or more of the network components of the cloud network 102 to provide the data streams 124*a-b* according to the first and second rates. The computing system 104 may utilize the network alert, network status, output form the MLM 116, and/or other data to determine the first and second rates. The data streams 124*a-b* may then be provided according to the first rate and the second rate, respectively. For example, the data stream 124*a* may be the high-priority data stream. The system 100 may then provide the data stream 124*a* to the user device 118*a* within minimal lag time or delay. The data stream 124*b*, by contrast, may be queued or otherwise delayed in order to reduce the load experienced by the could network 102. The data stream 124*b* may be queued at the global router 108 (e.g., the data stream 124*b* may be a lower-priority data stream for the entire cloud network 102), at the regional router 110*b* (e.g., the data stream 124*b* may be a lower-priority data stream for the associated region), and/or for the user device 118*b*.

Figure 2:
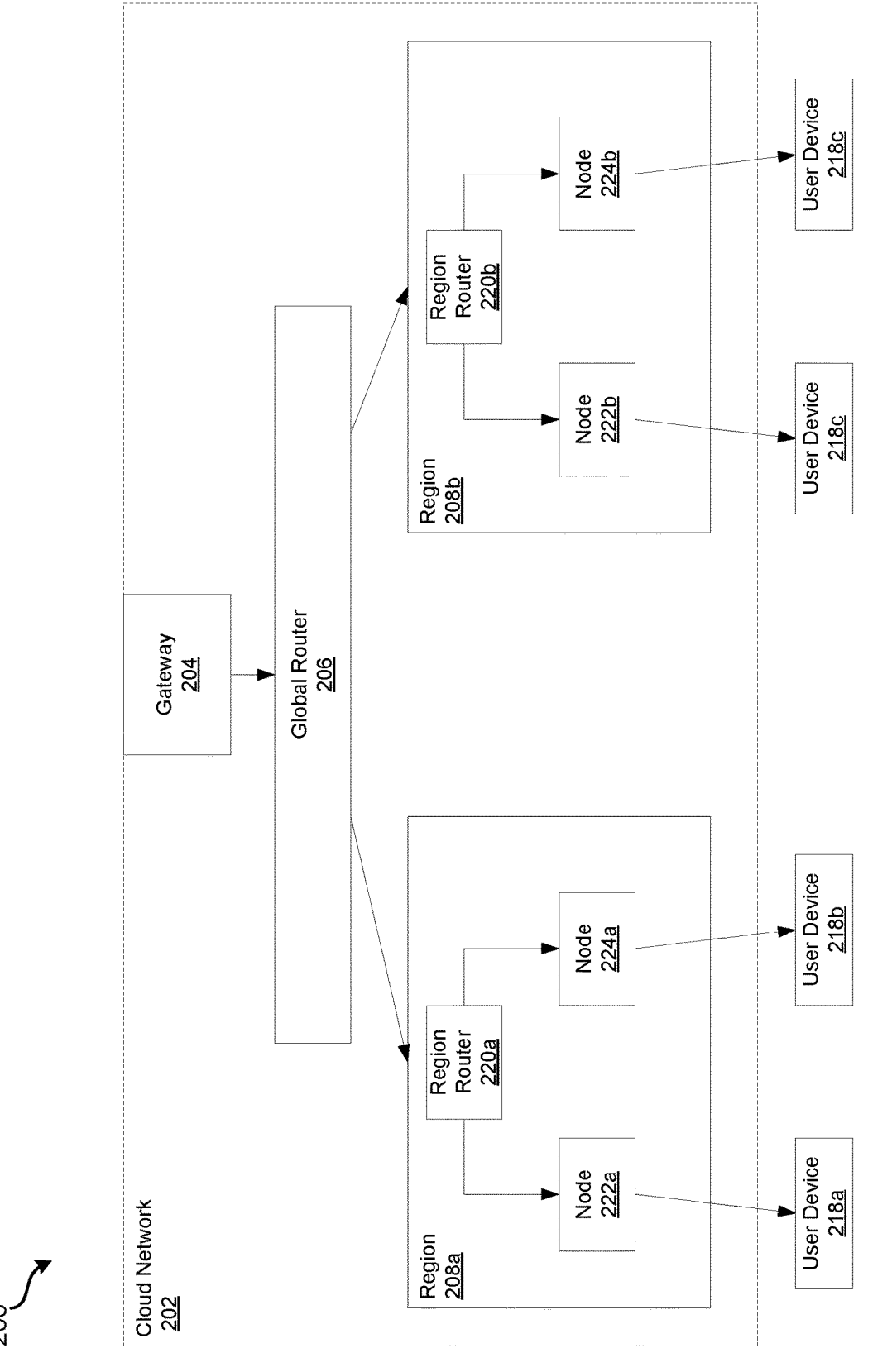
FIG. 2 illustrates a system for providing a data stream to user devices via a cloud network, according to certain embodiments.

FIG. 2 illustrates a system 200 for providing a data stream to user devices 218*a-d* via a cloud network 202, according to certain embodiments. The system 200 may be administered by a content provider in order to provide data streams to subscribers. The cloud network 202 may be implemented in a tenancy of the content provider on a publicly available cloud service. The cloud network 202 may include a gateway 204 and a global router 206. The cloud network 202 may also include regions 208*a-b*. Each of the regions 208*a-b* may include a region router 220*a*-respectively, and nodes 222*a-b* and 224*a-b*. The global router 206 and region routers 220*a-b* may be hardware and/or software components implemented at least in part on virtual compute instances of the cloud network 202. The nodes 222*a-b* and 224*a-b* may include compute instances hosting other network components for providing data streams to the user devices 218*a-d*.

The gateway 204 may receive requests for data streams from the user devices 218*a-d*. Although only one gateway 204 is shown, any number of gateways may be present. For example, the user devices 218*a-d* may each be located in a different geographic location. Each of the user devices 218*a-d* may therefore transmit requests to a different gateway. Additionally or alternatively, each gateway may be associated with particular regions (e.g., the regions 208*a-b*). One of ordinary skill in the art would recognize many different possibilities and configurations.

The gateway 204 may transmit the requests to the global router 206. The global router 206 may be configured to route the requests and/or requested data streams to at least one of the regions 208*a-b*. The requested data streams may be accessed by some other component, then passed to the global router 206. Additionally or alternatively, the global router 206 may cause metadata associated with the requested data streams to be transmitted downstream within the cloud network 202 such that the requested data streams are routed to a requesting user device. The global router 108 may parse a given request to determine which region 208*a-b* the request should be routed through. The region 208*a* or 208*b* may depend upon a network load of the cloud network 102, a network load of one or more of the regions 208*a-b*, characteristics associated with the requesting user device 218*a-d* (e.g., an IP address, a geographical location, etc.), and/or other factors.

The region routers 220*a-b* may receive requests and/or requested data streams from the global router 206. The region routers 220*a-b* may then route some of the requests to the respective nodes 222*a-b* and 224*a-b*. The region routers 220*a-b* may route requests to the respective nodes 222*a-b* based characteristics of the requesting user devices 218*a-d*. For example, the region router 220*a* may receive requests for data streams from the user devices 218*a-b*. Each of the user devices 218*a-b* may be associated with a respective account class. The region router 220*a* may route the request associated with the user device 218*a* to the node 222*a* according to the account class associated with the user device 218*a*. Similarly, the region router 220*a* may route the request associated with the user device 218*b* via the node 224*a*, based on the account class of the user device 218*b*.

Additionally or alternatively, the region routers 220*a-b* may route requests based on a network load of each of the nodes 222*a-b* and 224*a-b*. For example, the region router 220*b* may receive requests from the user device 218*c-d*. The user devices 218*c-d* may be associated with the same account class. Normally, the region router 220*b* may route both requests through the node 222*b*, according to the account class. The node 222*b* may have a higher network load than the node 224*b* at the time the request is received, however. Thus, the region router 220*b* may route the request associated with the user device 218*c* through the node 222*b*, while routing the request associated with the user device 218*d* through the node 224*b*. By routing the requests through different nodes, the region router 220*b* may better balance the network load between the nodes 222*b* and 224*b*.

Figure 3:
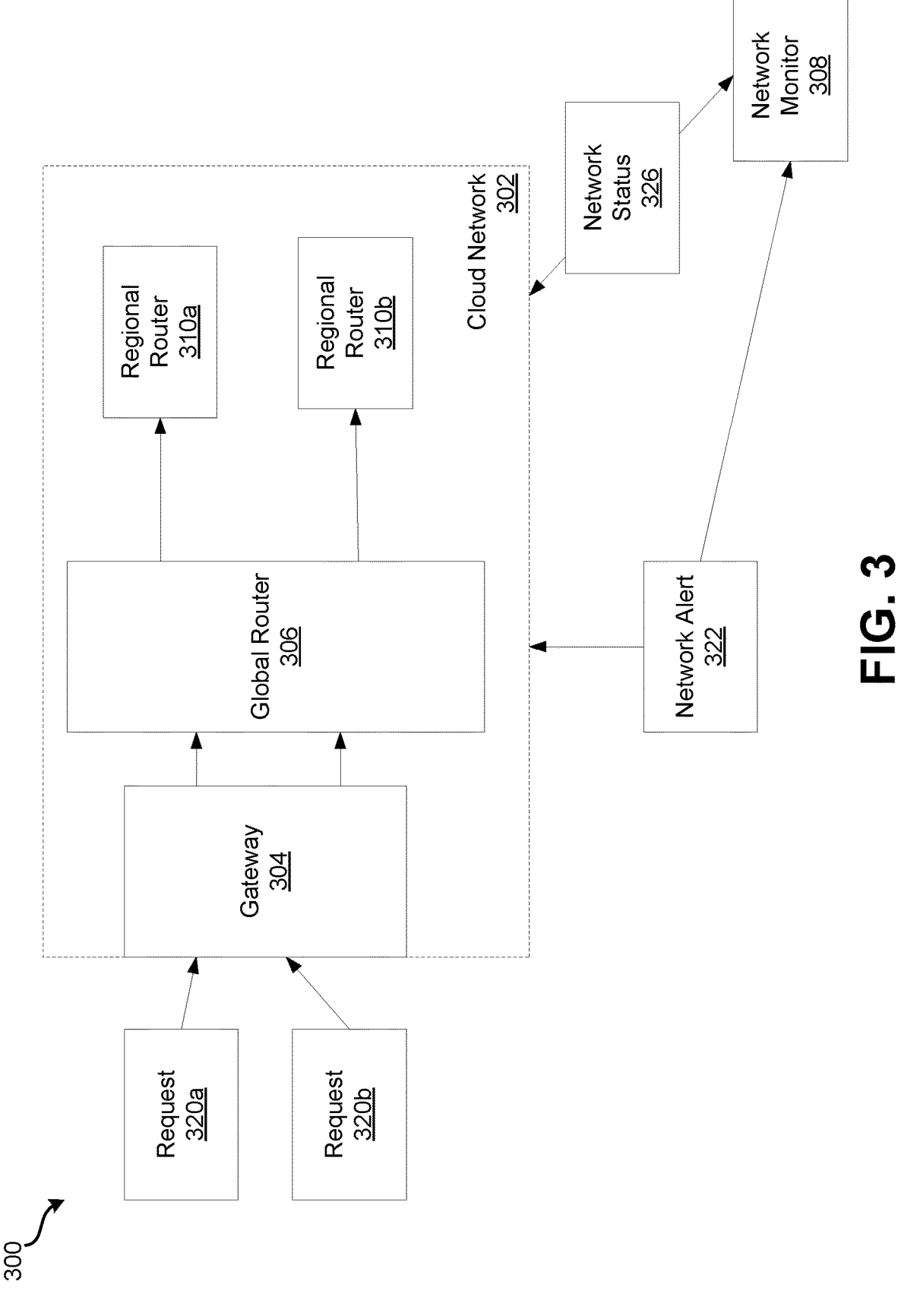
FIG. 3 illustrates a system for providing a network alert and a network status of a cloud network to a network monitor, according to certain embodiments.

FIG. 3 illustrates a system 300 for providing a network alert 322 and a network status 326 of a cloud network 302 to a network monitor 308, according to certain embodiments. The system 300 may include some or all of the system 100, described in FIG. 1. The cloud network 302 may be similar to the cloud network 202 in FIG. 2 and include similar components and functionality. The cloud network 302 may include a gateway 304, a global router 306, and regional routers 310*a-b*. The cloud network 302 may also include other network components (not shown) implemented on compute instances of the cloud network 302 (e.g., implemented on nodes within regions of the cloud network 302).

The network monitor 308 may include hardware and/or software components and be part of a computing system such as the computing system 104 in FIG. 1. The network monitor 308 may be configured to monitor the performance of the cloud network 302 and/or any of the network components thereof. The network monitor 308 may also be configured to transmit instructions to one or more of the network components. For example, the network monitor 308 may transmit instructions to instantiate a new network component to increase a capacity of the cloud network 302 in response to an increase in network load. The network monitor 308 may transmit instruction to remove a network component in response to a drop in network load, thus saving computing resources.

The cloud network 302 may receive requests 320*a-b* from respective client devices via the gateway 304. The requests 320*a-b* may indicate a respective requested data stream for each requested client device. The requests 320*a-b* may also include data associated with the respective client devices (e.g., an IP address, account class, etc.). The gateway 304 may then transmit the requests 320*a-b* to the global router 306. The global router 306 may parse the requests to determine a region associated with the requests 320*a-b*. The region may be determined based on an IP address of the respective client devices, the account class of the respective client devices, and/or other information and characteristics. The requests 320*a-b* may then be transmitted to the regional routers 310*a-b* according to the determined region.

The requests 320*a-b* may increase the network load experienced by the cloud network 302 and/or the components thereof. For example, the increased network load may cause the gateway 304 to receive requests faster than the gateway 304 can process the incoming requests, causing the gateway 304 to fail. Some of the requests (e.g., the requests 320*-b*) may not be processed or fulfilled by the gateway 304. Thus, the respective client devices may transmit a retry request for the unprocessed request at some interval (e.g., every second, every 5 seconds etc.). The retry requests may cause the network load to increase even more, further overwhelming the gateway 304. Additionally or alternatively, any of the downstream network components may also fail under the increased network load. For example, the global router 306 may fail under the increased network load. One or more of the regional routers 310*a-b* may also fail under the increased network load.

In another example, the gateway 304 and the global router 306 may function properly under the increased network load, but a network component within a region may fail. For example, the region associated with the regional router 310*b* may receive more requests than the regional router 310*a*. A network component within the region may fail (e.g., a compute instance within the node 224*b* in FIG. 2). In yet another example, the requests 320*a-b* may increase a network load of the cloud network 302 and/or the network components thereof above a traffic threshold of the cloud network 302. The traffic threshold may indicate a network load able to be handled by the cloud network 302 as configured. The traffic threshold may have a buffer built in (e.g., 10%, 20% etc.) such that transient spikes in network load may be handled without the cloud network 302 failing in some way.

In any case, a network alert 322 may be associated with the increased network load, generated in response to a network component failing and/or the traffic threshold being breached. The network alert 322 may be generated by a component of the cloud network 302 (e.g., the gateway 304 in response to the gateway 304 failing) or another component of the cloud network 302 (e.g., an unshown component for monitoring the network load). Additionally or alternatively, the network alert 322 may be generated by the network monitor 308. The network monitor 308 may collect network load data information from one or more of the network components (e.g., the gateway 304 and/or the regional router 310*a*) and generate the network alert 322 in response to a component failure or breach of the traffic threshold. The network alert 322 may include data associated with the cloud network 302 such as a current network load, a failure notice associated with a network component, and other data. The network alert 322 may also include data associated with the requests 320*a-b*. The data associated with the requests 320*a-b* may include an indication of the respective data streams, the respective client devices, a retry status, and other such information.

The network monitor 308 may also determine the network status 326. The network status 326 may be continuously updated by the network monitor 308, even when the network alert 322 is not present. For example, the network status 326 may be determined by a scan of the cloud network 302 performed at regular intervals (e.g., every 5 seconds). Additionally or alternatively, the network status 326 may be included in the network alert 322. The network status 326 may include a list of the network components instantiated in the cloud network 302 at a given time (e.g., when the network alert 322 is generated).

Figure 4:
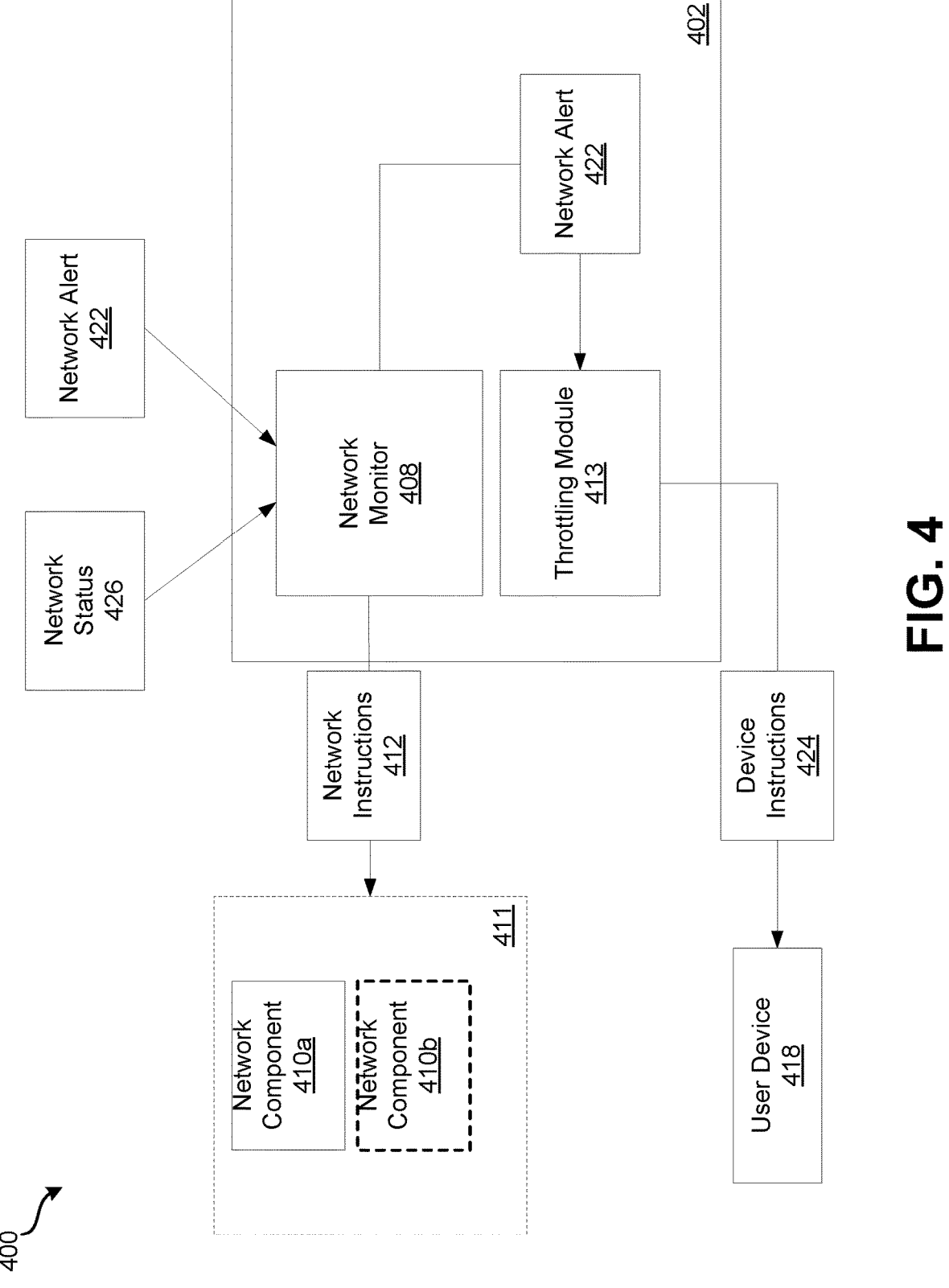
FIG. 4 illustrates a system for providing network instructions and device instructions in response to an increased network load, according to certain embodiments.

FIG. 4 illustrates a system 400 for providing network instructions 412 and device instructions 424 in response to an increased network load, according to certain embodiments. The system 400 may be similar to some or all of the system 100 in FIG. 1 and include similar components and functionalities. The system 400 may work in conjunction with the systems 200 and/or 300 in order to provide data streams to user devices. The system 400 may include a computing system 402 with a network monitor 408 and a throttling module 413. The computing system 402 may be similar to the computing system 104 in FIG. 1.

The network monitor 408 may receive a network alert 422 and a network status 426. The network alert 422 may be similar to the network alert 322 in FIG. 3 and include similar data. The data may include data associated with a cloud network 411 (similar to the cloud network 302 in FIG. 3) such as a current network load, a failure notice associated with a network component of the cloud network 411, and other data. The network alert 422 may also include data associated with requests for data streams. The data associated with the requests may include an indication of the respective data streams, respective client devices requesting the data streams, a retry status, and other such information.

The network monitor 408 may also determine a network status 426. The network status 426 may be continuously updated by the network monitor 408, even when the network alert 422 is not present. For example, the network status 426 may be determined by a scan of the cloud network 411 performed at regular intervals (e.g., every 5 seconds). Additionally or alternatively, the network status 426 may be included in the network alert 422. The network status 426 may include a list of the network components instantiated in the cloud network 411 at a given time (e.g., when the network alert 422 is generated).

The network monitor 408 may utilize some or all of the data in the network alert 422 and/or the network status 426 to generate network instructions 412. For example, the network alert 422 may indicate that a network component 410*a* of the cloud network 411 is at or near capacity based on a current network load. The network status 426 may indicate that a region of the cloud network 411 hosting the network component 410*a* has capacity to host another instance of the network component 410*a* (e.g., an additional compute instance within a node, an additional region router, etc.). The network instructions 412 may then include instructions to instantiate the network component 410*b*, such that the network load may be properly handled.

To determine a number of new network components to instantiate, the network monitor 408 may compare at least some of the data included in the network alert 422 and/or the network status 426 to a traffic threshold. The traffic threshold may indicate a network load that the cloud network 411 (and/or the components thereof) can handle in a current configuration. The traffic threshold may include a buffer (e.g., 5%, 10%, 20%, etc.) such that a transient increase in network load may be handled by the cloud network 411 without a degradation in providing data streams to user devices. The traffic threshold may be associated with the entire cloud network 411 and/or one or more of the network components thereof (e.g., the network component 410*a*). The network monitor 408 may instantiate a number of new network components (e.g., the network component 410*b*) such that a new traffic threshold is greater than the current network load.

As described in relation to FIG. 1, the network status 426 and the network alert 422 may be generated by an MLM prior to some event. The network alert 422 and/or the network status 426 may therefore include predicted request data and a predicted network load. The network monitor 408 may therefore generate the network instructions 412 in advance of the event, such that the new network component 410*b* is instantiated prior to the event. Because the network component 410*b* may be instantiated prior to the event, the cloud network 411 may be configured to handle the predicted network load and/or predicted requests indicated in the predicted request data.

The network monitor 408 may transmit some of all of the network alert 422 to the throttling module 413. For example, the network monitor 408 may transmit data indicating a number of retry requests received from user devices (e.g., a user device 418). To mitigate effects of the increased network load, the throttling module 413 may transmit device instructions 424 to the user device 418. The device instructions 424 may cause the user device 418 to delay or cease the transmission of retry requests. For example, the user device 418 may transmit retry requests to the cloud network 411 in response to transmitting an initial request that is unfulfilled and/or unprocessed. However, if the cloud network 411 is experiencing a network load above the capacity of the cloud network 411, the retry requests may also be unfulfilled and/or unprocessed, while flooding the cloud network 411 with retry requests. The device instructions 424 may therefore indicate a retry schedule, such that the user device 418 transmits a certain number of retry requests before displaying an error notification (e.g., 5, 10, etc.). The retry schedule may also include an interval by which user device is to transmit retry requests (e.g., every 10 seconds, etc.). Thus, the throttling module 413 may reduce the network load experienced by the cloud network 411 until the network load is reduced and/or the capacity of the cloud network 411 is increased (e.g., by new network component 410*b*).

FIG. 5 illustrates system 500 including a machine learning model 516 for prioritizing data streams, according to certain embodiments. The system 500 may include some or all of the system 100 in FIG. 1. The system 500 may also operate independently or in conjunction with the systems 200, 300, and 400 described in FIGS. 2-4, respectively. The system 500 may include the machine learning model (MLM) 516, a network monitor 508, and a throttling module 513. The MLM 516 may be similar to the MLM 116 in FIG. 1 and include similar functionalities. The network monitor 508 may be similar to the network monitor 408 in FIG. 4 (and/or the network monitor 112) and include similar functionalities and components. The throttling module 513 may be similar to the throttling module 114 in FIG. 1 and/or the throttling module 413 in FIG. 4 and include similar functionalities and components.

The MLM 516 may receive a network alert 522. The network alert 522 may include request data indicating one or more data streams requested by user devices. The request data may additionally or alternatively include predicted request data, as described in relation to FIG. 1. The network alert 522 may also include network information (such as the network status 426 in FIG. 4), data associated with the user devices (e.g., a region (either geographical or virtual), an account class, etc.), characteristics associated with the user devices, and other such information. The MLM 516 may be trained using the historical traffic data 532, the data stream metadata 534, and the events 536 to assign a priority score to the data streams indicated in the request data.

The MLM 516 may also access historical traffic data 532, data stream metadata 534, and events 536. The historical traffic data 532, the data stream metadata 534, and the events 536 may be included in a single data set, or as separate data sets (as is shown in FIG. 5). The historical traffic data 532 may include information relating to network loads experienced by a cloud network (e.g., the cloud network 411 in FIG. 4). The information may include a total network load, a network load experienced by one or more network components of the cloud network (e.g., a global router, region router, nodes within a region, compute instances of the nodes, etc.), and other such information.

The information may also include request data indicating historically requested data streams. The historically requested data streams may be correlated to one or more of the other data sets (e.g., the events 536). For example, a portion of the historical traffic data 532 may be correlated to a prior political event included in the events 536. The portion may indicate that the total network load experienced by the cloud network during the prior political event was higher than an average network load. The portion may also indicate that a particular data stream was the most requested data stream during the prior political event. Thus, when the MLM 516 analyzes the network alert 522, the MLM 516 may assign a higher priority score to the particular data stream.

The data stream metadata 534 may include information associated with the data streams provided by a content provider. Continuing the example from above, the data stream metadata 534 may include search information associated with a plurality of data streams near a current or upcoming political event. While the particular data stream may have been the most requested data stream during the prior political event, a second data stream may be the most searched data stream (e.g., as determined by aggregated search engine data). The MLM 516 may then determine that the most searched data stream during the prior political event is correlated to the particular data stream. In other words, the most searched data stream was correlated with the most requested data stream. Thus, the MLM 516 may assign a priority score to the second data stream, accounting for the correlation between being the most searched and most requested.

The events 536 may include information indicating past and/or future events that may affect requests for data streams. For example, the events 536 may indicate the past political event from above. The events 536 may also indicate future events, such as the upcoming political event. As described above, the information included in events 536 may be correlated with information in other data sets. Additionally or alternatively, the MLM 516 may utilize the events 536, the historical traffic data 532 and the data stream metadata 534 to generate a predicted network load and predicted request data (as is described in relation to FIG. 1). The predicted network load and/or the predicted request data may include priority scores for some or all of the data streams provided by the content provider.

The MLM 516 may generate an output 518 to the network monitor 508 and/or the throttling module 513. The output 518 may be generated in response to the network alert 522 or may be generated in anticipation of an increase in network load (e.g., the predicted network load and the predicted request data). The output 518 may include the priority scores assigned to each of the data streams provided by the content provider. The output 518 may be used by the network monitor 508 to instantiate one or more new network components such that the cloud network can handle an increased network load. The output 518 may also be used by the throttling module 513 to decrease network traffic based in part on the priority scores.

Figure 6:
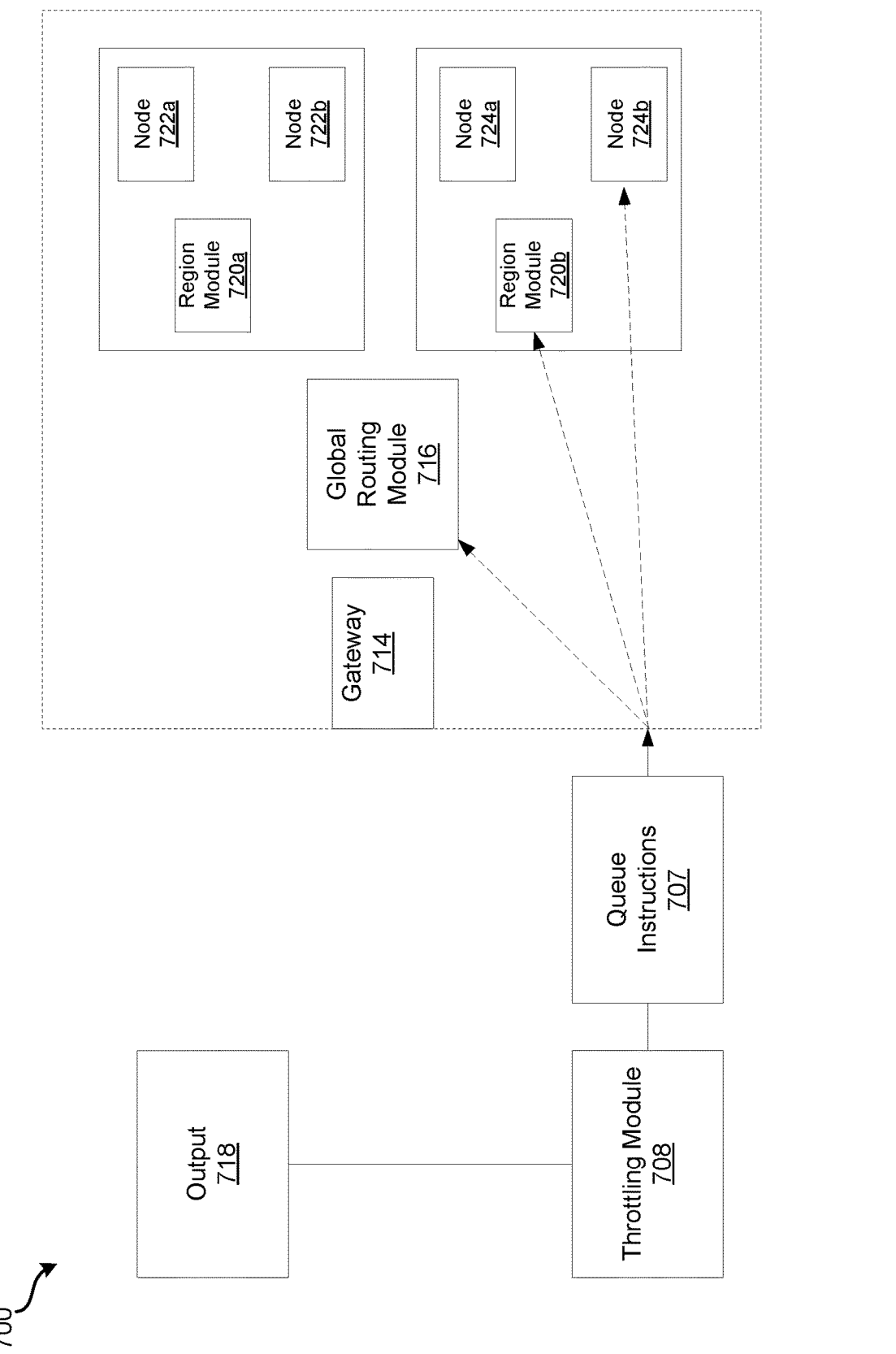
FIG. 6 illustrates a system for queuing data streams, according to certain embodiments.

FIG. 6 illustrates a system 600 for queuing data streams, according to certain embodiments. The system 600 may be similar to some or all of the system 100 in FIG. 1. The system 600 may operate separately or in conjunction with some or all of the systems 200, 300, 400, and 500 in FIGS. 2-5, respectively. The system 600 may include a cloud network 602 and a computing system 604. The cloud network 602 may be similar to the cloud network 202 in FIG. 2 and include similar components and functionalities. The cloud network 602 may include a gateway 614, a global routing module 616, and include regions 619a-b. Each of the regions 619a-b may include a region router 620a-b and nodes 622a-b and 624a-b. Each of nodes 622a-b and 624a-b may further include one or more compute instances hosting other network components for providing data streams to user devices.

The computing system 604 may be similar to the computing system 104 in FIG. 1 and include similar components and functionalities. The computing system 604 may include throttling module 608. The throttling module 608 may be similar to the throttling module 413 in FIG. 4 and the throttling module 118 in FIG. 1. The throttling module 608 may receive an output 618 from an MLM (e.g., the MLM 516 in FIG. 5) and/or a network monitor (e.g., the network monitor 112 in FIG. 1). The output 618 may be transmitted to the throttling module 608 in response to a network alert indicating that a network load of the cloud network 602 (or components thereof) is causing or about to cause a failure or other service degradation. The output 618 may include information indicating priority scores for a plurality of data streams, provided by the content provider. The priority scores may be based on a number of requests received for each data stream, predicted request data, characteristics of user devices transmitting the requests, and other such information. The output 618 may also include a network status of the cloud network 602 and/or the components thereof.

The throttling module 608 may utilize some or all of the output 618 to generate queue instructions 606. The queue instructions 606 may be transmitted to one or more of the network components of the cloud network 602. The queue instructions 606 may include instructions to queue a data stream by one or more of the network components according to the priority score. For example, the output 618 may indicate that a first data stream is a high-priority data stream for the entire cloud network 602. Other data streams may therefore have a lower priority score. The throttling module 608 may therefore generate queue instructions 606 that cause the global router 616 to fulfill requests for the first data stream. The requests for the other data streams may be queued by the global router 616. The requests for the other data streams may then be routed by global router 616 when the network load decreases enough to permit the processing of the other requests.

Additionally or alternatively, the output 618 may indicate that a second data stream is a high-priority data stream for the region 619b. For example, the second data stream may be associated with a sporting event. User devices associated with the region 619b may request the second data stream at a higher volume than user devices associated with the region 619a. Thus, the network load experienced by the network components of the region 619b may be higher than the network load experienced by the region 619a. The throttling module 608 may therefore generate the queue instructions 606 to include instructions to the region router 620b to fulfil requests for the second stream while queuing requests for other data streams. The requests for the other data streams may then be routed by the region router 620b when the network load decreases enough to permit the processing of the other requests.

Additionally or alternatively, the output 618 may indicate that an account class of a first type is a higher priority than that of a second account class. The node 624a may be associated with the first account class and the node 624b may be associated with the second account class. The throttling module 608 may therefore generate the queue instructions 606 to instruct the node 624b (or components thereof) to queue some or all requests for data stream. The node 624a may continue to fulfill requests for data streams normally. The requests queued at the node 624b may be fulfilled the network load decreases enough to permit the processing of the queued requests.

Each of data streams in the example above may be associated with a rate at which the requests may be fulfilled.

For example, the queue instructions 606 may indicate that requests for the first data stream may be fulfilled as quickly as the requests are received (within the limits of the cloud network 602 and the components thereof). Requests for the second data stream may be fulfilled at a second rate. For example, the second rate may indicate that a request for the second data stream is to be processed every second (or faster, as permitted by the network load). The queue instructions 606 may also indicate that the requests made by user devices of the second account class are to be fulfilled every five seconds (or faster, as permitted by the network load).

The examples above are only sample embodiments. Some or all of the examples described above may be combined with other examples. For example, the global router 616 may cause a first data stream to be queued, the region router 620b may cause a second data stream to be queued. One of ordinary skill in the art would recognize many different possibilities and combinations.

Figure 7:
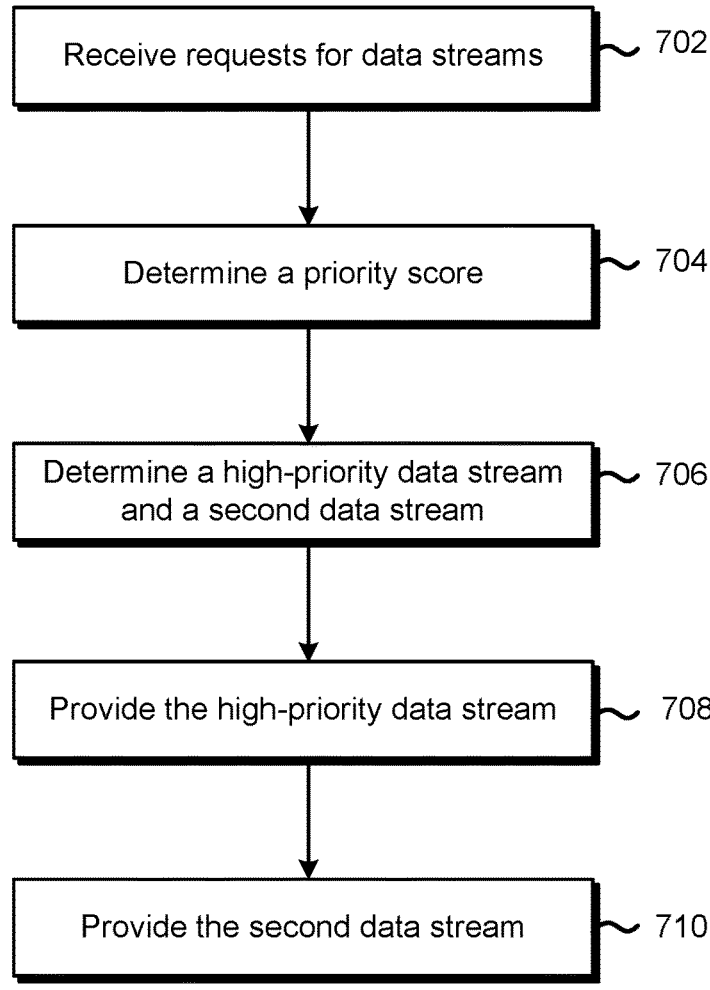
FIG. 7 illustrates a flowchart of a method for providing data streams according to a priority score, according to certain embodiments.

FIG. 7 illustrates a flowchart of a method 700 for providing data streams according to a priority score, according to certain embodiments. The method 700 may be performed by some or all of the systems described herein, such as the system 100 in FIG. 1. The steps of the method 700 may be performed in a different order than is described, and/or may be combined with other steps. In some embodiments, some steps may be skipped altogether.

At step 702, the method 700 may include receiving, by a computing system, a network alert associated with a cloud network. The cloud network may be configured to provide a plurality of data streams to user devices. The cloud network may include one or more network components. The network alert may include request data associated with one or more requests received from respective user devices for at least one of the plurality of data streams. The requests data may indicate the data streams corresponding to each of the one or more requests. The network alert may also include information indicating that the cloud network and/or the components thereof are experiencing an increased network load. The increased network load may be greater than a capacity of the cloud network and/or the components thereof.

At step 704, the method 700 may include determining, by the computing system, a network status of the cloud network. The network status may indicate a network load of the cloud network. For example, the network status may include a total network load of the cloud network and/or may include a network load experienced by the one or more network components. A network monitor (e.g., the network monitor 112 in FIG. 1) may request the network status from one or more network components of the cloud network or may scan the cloud network and generate the network status. The network status may include a listing of all instantiations of network components within the cloud network, within a region of the cloud network, etc. The network status may be included in the network alert or may be determined separately.

In some embodiments, the network alert and/or the network status may include predicted request data generated by a machine learning model. The network alert and/or the network status may also include a predicted network load generated by the machine learning model. The predicted request data and/or the predicted network load may be based on one or more characteristics of the respective user devices (e.g., a geographical location, associated region of the cloud network, IP address, account class, etc.). The predicted request data and the predicted network load may be based metadata associated with the plurality of data streams, such as which data streams are searched for at what rate (e.g., via a search engine).

At step 706, the method 700 may include providing, by the computing system, at least one of the request data and the network status to a machine learning model. The machine learning model may be configured to assign a priority score of each of the plurality of data streams based on the request data and/or the network status. The machine learning model may be trained using is trained using at least one of one current event data, future event data, and data associated with historical data streams as is described in relation to FIG. 5.

At step 708, the method 70 may include determining, by the computing system and using the priority scores of the machine learning model, a high-priority data stream of the plurality of data streams and a second data stream of the plurality of data streams. The high-priority data stream may be determined by the MLM, a network monitor, a throttling module (e.g., the throttling module 613), and/or any other suitable component of the computing system. The high-priority data stream may be determined for the whole cloud network, a region within the cloud network, an account type of a user device requesting data streams, or other such factors.

At step 710, the method 700 may include providing, by the computing system, instructions to at least one of the one or more network components of the cloud network. The instructions may indicate that the high-priority stream of the plurality of data streams is to be provided to a first user device according to a request for the high-priority data stream at a first rate. The first rate may be based in part on the network alert, request data, and/or the network status. The first rate may indicate that the high-priority data stream is not to be queued.

At step 712, the method 700 may include providing, by the computing system, instructions to at least one of the one or more network components of the cloud network. The instructions may indicate that the second data stream of the plurality of data streams is to be provided to a second user device corresponding to a request for the second data stream at a second rate. For example, the second rate may indicate that the second data stream is to be provided (e.g., have a request for the second data stream fulfilled) every 5 seconds, etc. as network load allows. The request for the second data stream may be queued by one or more network components according to the second rate.

In some embodiments, determining, by the computing device, that the network load exceeds a traffic threshold of the cloud network. The traffic threshold may be set below an actual load limit of the cloud network (e.g., 5% less, 10% less, 20% less, etc.). Thus, transient spikes in network load may be handled by the cloud network without overloading the cloud network. The method 700 may also include determining, by the computing device, the first rate and the second rate such that the high-priority data stream and the second data stream may be provided to the first user device and the second user device, respectively, and the network load is below the traffic threshold.

In some embodiments, a portion of the request data may include a retry request. Based at least in part on the network status, the method 700 may include determining, by the computing system, a user device corresponding to the retry request. The method 700 may then include transmitting, by the computing system, instructions (e.g., the device instructions 424 in FIG. 4) to the user device associated with the retry request. The instructions may indicate that subsequent retry requests are to be transmitted according to a retry schedule. The retry schedule may be based in part on the network load.

What is claimed is:

1. A method of providing media data streams, comprising:

receiving, by a computing system, a network alert associated with a cloud network configured to provide a plurality of media data streams to user devices and comprising one or more network components, the network alert comprising request data associated with one or more requests received from respective user devices for at least one of the plurality of media data streams;

determining, by the computing system, a network status of the cloud network, the network status indicating a network load of the cloud network;

determining, by the computing system, that the network load exceeds a traffic threshold of the cloud network;

providing, by the computing system, at least one of the request data and the network status to a machine learning model, the machine learning model configured to assign a priority score of each of the plurality of media data streams based on the request data and/or the network status;

determining, by the computing system and using the priority scores of the machine learning model, a high-priority media data stream of the plurality of media data streams and a second media data stream of the plurality of media data stream;

determining, by a throttling module of the computing system, a first rate for the high-priority media data stream and a second rate for the second media data stream, based at least in part on the network load;

providing, by the computing system, first instructions to at least one of the one or more network components indicating that the high-priority media data stream of the plurality of media data streams is to be provided to a first user device according to a request for the high-priority media data stream at the first rate;

providing, by the computing system, second instructions to at least one of the one or more network components indicating that the second media data stream of the plurality of media data streams is to be provided to a second user device corresponding to a request for the second media data stream at the second rate, such that the high-priority media data stream and the second media data stream are provided to the first and second user devices, respectively, and the network load is below the traffic threshold;

receiving, by the computing system and from the second user device, a retry request for the second media data stream indicating the second media data stream was previously requested but not fulfilled;

modifying, by the machine learning model and based at least in part on the priority scores, a retry schedule; and transmitting, by the computing system and based at least in part on the priority score, third instructions to the second user device to transmit subsequent retry requests to the cloud network according to the retry schedule.

2. The method of claim 1, further comprising:

determining, by the computing system, that the network load exceeds a traffic threshold of the cloud network; and providing, by the computing system, instructions to at least one network component of the one or more network components to instantiate a new network component such that the traffic threshold of the network is increased above the network load indicated in the network status.

3. The method of claim 1, wherein the network alert comprises predicted request data generated by the machine learning model and the network status comprises a predicted network load generated by the machine learning model.

4. The method of claim 3, wherein the predicted request data and the predicted network load are generated by the machine learning model and based on one or more characteristics of the respective user devices.

5. The method of claim 3, wherein the predicted request data and the predicted network load are generated by the machine learning model and based metadata associated with the plurality of media data streams.

6. The method of claim 1, wherein the machine learning model is trained using at least one of one current event data, future event data, and data associated with historical media data streams.

7. The method of claim 1, wherein the priority score of each of the plurality of media data streams is determined in part based on a characteristic of the respective user devices.

8. The method of claim 1, wherein the retry schedule is based at least in part on the network load.

9. A system for providing media data streams, comprising:

a network monitor;

a throttling module;

a machine learning model;

one or more processors; and a non-transitory-computer readable medium comprising instructions that, when executed by the one or more processors, cause the system to perform operations to:

receive, by the network monitor, a network alert associated with a cloud network configured to provide a plurality of media data streams to user devices and comprising one or more network components, the network alert comprising request data associated with one or more requests received from respective user devices for at least one of the plurality of media data streams;

determine, by the network monitor, a network status of the cloud network, the network status indicating a network load of the cloud network;

determine, by the network monitor, that the network load exceeds a traffic threshold of the cloud network;

provide, by the network monitor, at least one of the request data and the network status to the machine learning model, the machine learning model configured to assign a priority score of each of the plurality of media data streams based on the request data and/or the network status;

determine, by the system and using the priority scores of the machine learning model, a high-priority media data stream of the plurality of media data streams and a second media data stream of the plurality of media data streams;

determine, by the throttling module of the system, a first rate for the high-priority media data stream and a second rate for the second media data stream, based at least in part on the network load;

provide, by the throttling module, instructions to at least one of the one or more network components indicating that the high-priority media data stream of the plurality of media data streams is to be provided to a first user device according to a request for the high-priority media data stream at a first rate;

provide, by the throttling module, instructions to at least one of the one or more network components indicating that the second media data stream of the plurality of media data streams is to be provided to a second user device corresponding to a request for the second media data stream at a second rate, such that the high-priority media data stream and the second media data stream are provided to the first and second user devices, respectively, and the network load is below the traffic threshold;

receive, by the system and from the second user device, a retry request for the second media data stream indicating the second media data stream was previously requested but not fulfilled;

modify, by the machine learning model and based at least in part on the priority scores, a retry schedule; and transmit, by the system and based at least in part on the priority score, third instructions to the second user device to transmit subsequent retry requests to the cloud network according to the retry schedule.

10. The system of claim 9, wherein a portion of the request data comprises a retry request, and based at least in part on the network status, and the instructions further cause the system to:

determine a user device corresponding to the retry request; and transmit, by the throttling module, instructions to the user device associated with the retry request to send subsequent retry requests to cloud network according to a retry schedule.

11. The system of claim 9, wherein the instructions further cause the system to:

determine, by the network monitor, that the network load exceeds a traffic threshold of the cloud network; and provide, by the network monitor, instructions to at least one network component of the one or more network components to instantiate a new network component such that the traffic threshold of the network is increased above the network load indicated in the network status.

12. The system of claim 9, wherein the network alert comprises predicted request data generated by the machine learning model and the network status comprises a predicted network load generated by the machine learning model.

13. The system of claim 12, wherein the predicted request data is generated, at least in part by a second machine learning model and the predicted network load is generated, at least in part by a third machine learning model.

14. A system comprising:

one or more processors; and a non-transitory-computer readable medium comprising instructions that, when executed by the one or more processors, cause the system to perform operations to:

receive a network alert associated with a cloud network configured to provide a plurality of media data streams to user devices and comprising one or more network components, the network alert comprising request data associated with one or more requests received from respective user devices for at least one of the plurality of media data streams;

determine a network status of the cloud network, the network status indicating a network load of the cloud network;

provide at least one of the request data and the network status to a machine learning model, the machine learning model configured to assign a priority score of each of the plurality of media data streams based on the request data and/or the network status;

determine, using the priority scores of the machine learning model, a high-priority media data stream of the plurality of media data streams and a second media data stream of the plurality of media data streams;

provide instructions to at least one of the one or more network components indicating that the high-priority media data stream of the plurality of media data streams is to be provided to a first user device according to a request for the high-priority media data stream at a first rate, the first rate determined based at least in part on the network load;

provide instructions to at least one of the one or more network components indicating that the second media data stream of the plurality of media data streams is to be provided to a second user device corresponding to a request for the second media data stream at a second rate, the second rate based at least in part on the network load;

receive, by the system and from the second user device, a retry request for the second media data stream indicating the second media data stream was previously requested but not fulfilled;

modify, by the machine learning model and based at least in part on the priority scores, a retry schedule; and transmit, by the system and based at least in part on the priority score, third instructions to the second user device to transmit subsequent retry requests to the cloud network according to the retry schedule.

15. The system of claim 14, wherein a portion of the request data comprises a retry request, and based at least in part on the network status, and the instructions further cause the system to:

determine a user device corresponding to the retry request; and transmit instructions to the user device associated with the retry request to send subsequent retry requests to the cloud network according to a retry schedule.

16. The system of claim 14, wherein the network alert comprises predicted request data generated by the machine learning model and the network status comprises a predicted network load generated by the machine learning model.

17. The system of claim 14, the priority score of each of the plurality of media data streams is determined in part based on a characteristic of the respective user devices.

18. The method of claim 1, wherein the retry schedule includes a number of retry requests, an interval between subsequent retry requests, or both the number of retry requests and the interval between subsequent retry requests.

19. The method of claim 18, wherein modifying the retry schedule comprises modifying a number of retry requests the user device is permitted to perform prior to halting subsequent retry requests.

20. The method of claim 18, wherein modifying the retry schedule comprises modifying an interval between subsequent retry requests to be sent by the user device.

* * * * *